United States Patent [19]

Engeler et al.

[11] Patent Number: 5,568,446
[45] Date of Patent: Oct. 22, 1996

[54] DUAL MODE ULTRASONIC IMAGER SYSTEM

[75] Inventors: William E. Engeler, Scotia, N.Y.; David B. Ribner, Andover, Mass.

[73] Assignee: General Electric Company, Schenectady, N.Y.

[21] Appl. No.: 516,078

[22] Filed: Aug. 17, 1995

[51] Int. Cl.⁶ .............................. G03B 42/06; A61B 8/00
[52] U.S. Cl. ........................................ 367/11; 128/660.05
[58] Field of Search .................... 367/7, 11; 128/660.04, 128/660.05, 660.07, 661.09; 364/413.25

[56] References Cited

U.S. PATENT DOCUMENTS

| | | | |
|---|---|---|---|
| 4,141,347 | 2/1979 | Green et al. | 128/660.05 |
| 4,182,173 | 1/1980 | Papadofrangakis et al. | 73/194 |
| 4,398,540 | 8/1983 | Takemura et al. | 128/660.05 |
| 4,983,970 | 1/1991 | O'Donnell et al. | 341/122 |
| 5,014,710 | 5/1991 | Maslak et al. | 128/660.05 |
| 5,148,809 | 9/1992 | Biebeleisen-Knight et al. | 128/660.07 |
| 5,165,413 | 11/1992 | Maslak et al. | 128/660.05 |
| 5,170,792 | 12/1992 | Sturgill et al. | 128/660,05 |
| 5,188,112 | 2/1993 | Sturgill et al. | 128/660.09 |
| 5,278,757 | 1/1994 | Hoctor et al. | 128/660.07 |
| 5,349,525 | 9/1994 | Dunki-Jacobs et al. | 364/413 |
| 5,447,158 | 9/1995 | Nakajima et al. | 128/660.09 |

Primary Examiner—Daniel T. Pihulic
Attorney, Agent, or Firm—Marvin Snyder

[57] ABSTRACT

A dual mode ultrasonic imager system operative in both a two dimensional 2-D) mode and doppler mode, includes a plurality of transducers for receiving analog ultrasonic signals and converting them to analog electrical signals, and an analog to digital (A/D) converter system for converting the analog electrical signals to digital signals for further processing. The A/D converter system includes a digital to analog (D/A) converter for converting the digital signals into analog feedback signals, and an analog summer for receiving the analog electrical signals and combining them with the analog feedback signals. An integrator is selectively coupled to receive an output signal from the analog summer and to generate an integrated analog signal. An A/D converter selectively receives, and converts to an equivalent digital signal, one of the integrated analog signal and an output signal of the analog summer. During the 2-D mode, the integrator is bypassed and the A/D converter receives the output signal of the analog summer for conversion to a digital signal. In the doppler mode, the A/D converter receives from the integrator the integrated analog signal and converts it to a digital signal.

13 Claims, 4 Drawing Sheets

DUAL MODE ULTRASONIC IMAGER SYSTEM

BACKGROUND OF THE INVENTION

1. Field of the Invention

This invention relates to ultrasonic imaging systems and, more particularly, to an ultrasonic imaging system that functions effectively in both two dimensional (2-D) and doppler modes.

2. Description of the Related Art

Duplex ultrasonic imaging systems operate in both two dimensional (2-D) and doppler modes. These duplex systems, however, have suffered from poor performance when operated in the doppler mode. For example, a phased array ultrasound system might utilize only eight-bit resolution parallel (flash) analog to digital (A/D) converters for two-dimensional (2-D) imaging. Higher resolutions, however, are required for the ultrasonic imaging system to operate effectively in the doppler mode.

One way to achieve higher resolution is to extend the bits processed by the flash A/D converter, but the cost and complexity of the circuit are greatly increased as a result. The reason for this increased cost and complexity is that a flash converter simultaneously compares an input analog voltage to $2^n-1$ threshold voltages to produce an n-bit digital code representing the analog voltage. An 8-bit flash A/D converter thus requires $2^8-1$ comparators, or 255 comparators. Therefore, extending the flash A/D converter to increase the resolution above that required by the 2-D mode is costly due to the exponentially increasing number of analog comparators required for an ultrasound imaging system. For example, 10-bit resolution would require 1,023 comparators, and 12-bit resolution would require 4,095 comparators.

In light of the foregoing, there exists a need for an ultrasonic imaging system that can operate effectively in both the 2-D and doppler modes, without incurring the added cost and complexity of higher resolution flash A/D converters.

SUMMARY OF THE INVENTION

The present invention is directed to an apparatus and method of ultrasonic imaging that substantially obviates one or more of the problems due to the limitations and disadvantages of the related art.

Briefly, in accordance with a preferred embodiment of the invention, an analog to digital (A/D) conversion apparatus for ultrasonic imaging, operative in both a two dimensional (2-D) mode and doppler mode, comprises a plurality of transducers for receiving analog ultrasonic signals and converting them to analog electrical signals. The analog electrical signals are filtered and supplied to an A/D converter. The A/D converter further comprises a first analog summer for receiving the analog electrical signals and combining them with a feedback signal of a first digital to analog (D/A) converter, and a first integrator selectively coupled to receive an output signal from the first analog summer and for generating a first integrated analog signal. The A/D converter is disposed for receiving one of the first integrated analog signal and the output signal of the first analog summer, and for generating an equivalent digital signal, while the first D/A converter is disposed to receive the digital signal from the A/D converted and to convert the digital signal to an equivalent analog signal for application to the first analog summer.

During the 2-D mode, the first integrator is bypassed and the A/D converter is disposed to receive the output signal of the first analog summer. During the doppler mode, the first integrator is coupled to the A/D converter and the A/D converter is disposed to receive the first integrated analog signal.

In another aspect, the invention provides for a method of analog to digital conversion of ultrasonic signals operative in both a two dimensional (2-D) mode and doppler mode, the method comprising the steps of:

(1) receiving an analog ultrasonic signal from each of a plurality of transducers;

(2) converting the analog ultrasonic signals to analog electrical signals;

(3) filtering the analog electrical signals;

(4) summing the analog electrical signals with an output signal of a first digital to analog (D/A) converter;

(5) integrating selectively, the summed analog electrical signals (6) converting the integrated, summed analog electrical signals to digital signals; and (7) providing the digital signals to a digital signal processing system for signal processing, and to the first D/A converter.

During the 2-D mode, the integrating step is bypassed and the A/D converter receives an output signal from the first analog summer. During the doppler mode, the integrating step is activated and the A/D converter receives a first integrated analog signal.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
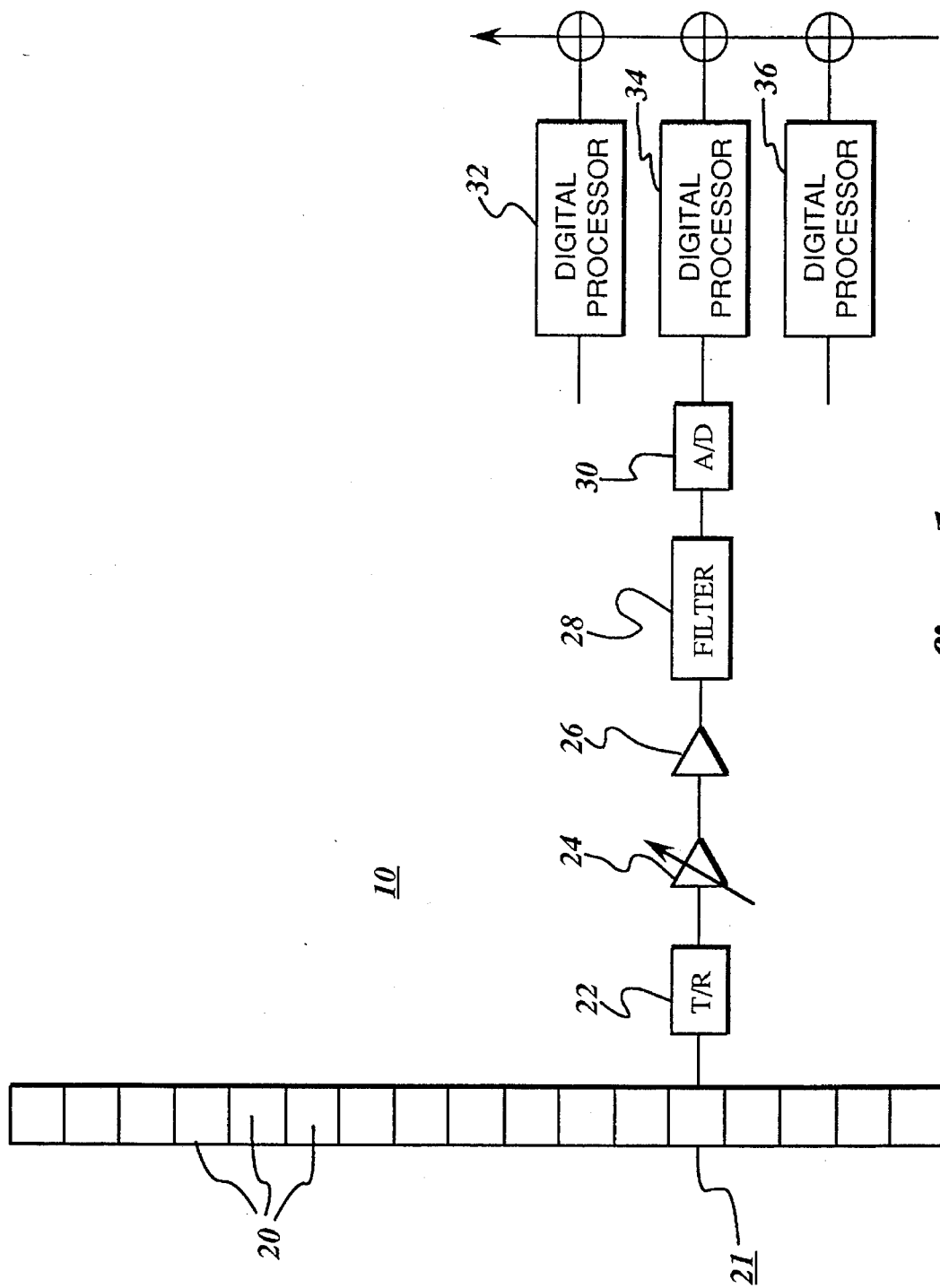
FIG. 1 is a block diagram representation of a portion of a related art phased array ultrasound system.

FIG. 1 illustrates a portion of a conventional phased array ultrasound system 10. For simplicity of illustration and ease of discussion, only one channel is depicted in FIG. 1. Those skilled in the art will understand that each transducer would have a separate channel.

In the 2-D imaging mode, analog ultrasonic signals received at transmitter/receiver 22 from each transducer 20 of an array 21 are converted to analog electrical signals and are then subsequently amplified and filtered by the analog section of the channel associated with that respective transducer in preparation for A/D conversion.

Specifically, amplifier 24 is time varying and provides a time gain control (TGC) function for the signal. A second amplifier 26 provides additional amplification of the signal. A filter 28 reduces noise by limiting the bandwidth of the signal and avoids aliasing. The amplified and filtered analog signals in each channel undergo A/D conversion in converter 30. The resulting digital signal 34 is processed to provide all of the remaining required imaging functions, for example, baseband signal processing and delay functions, and is then summed with the output signals of the other channels (e.g., 32, 36) to form the final image signal.

In the doppler imaging mode, an arrangement similar to the above 2-D mode is used; however, instead of all of transducers 20 receiving ultrasonic signals, as in the 2-D mode, some of the transducers act as transmitters.

Figure 2:
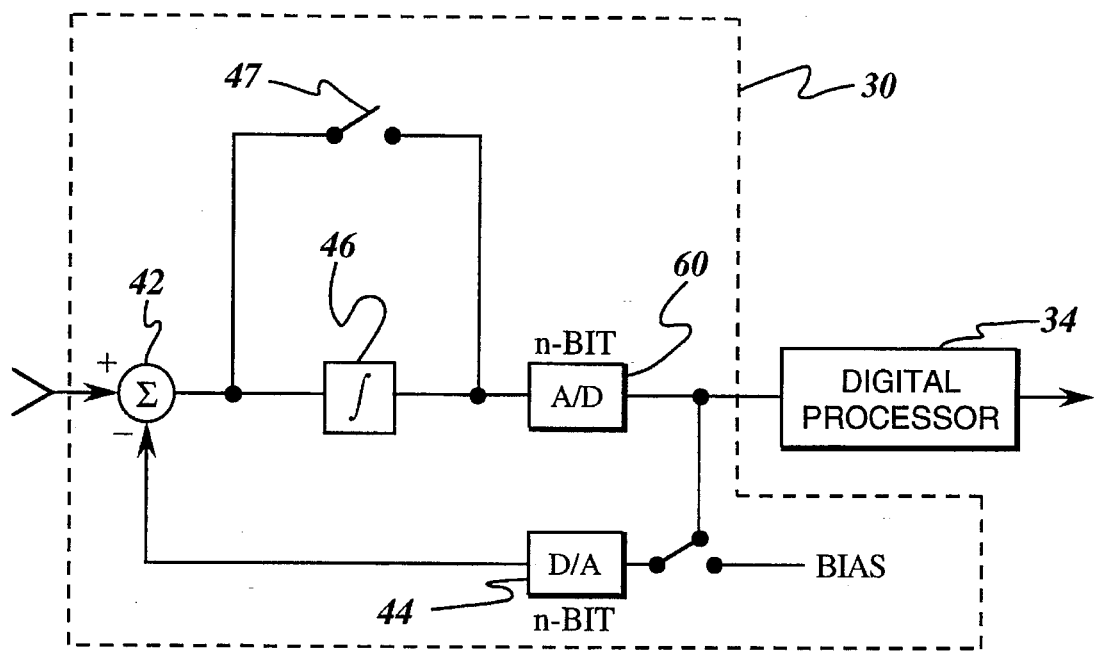
FIG. 2 is a block diagram representation of the A/D conversion section of a system according to the present invention.

FIG. 2 illustrates a unique A/D conversion section of an ultrasound imaging system to enhance performance of the doppler mode of the system. As shown in FIG. 2, prior to entering an n-bit A/D converter 60 which, for example, may be an 8-bit flash A/D converted, the amplified and filtered analog signals are supplied to an analog summer 42. Summer 42 combines the analog signals with the output signal of an n-bit D/A converter 44 which, for example, may be an 8-bit fixed reference type D/A converter.

An integrator 46 is selectively coupled to summer 42 for producing a signal proportional to the summed analog signals over time. Integrator 46 is activated to perform time integration only when the system is in doppler mode; the integrator is bypassed by closing a bypass switch 47, when the system is in 2-D mode. This circuit arrangement provides loop feedback from the D/A converter when the system is in the doppler mode, and bias correction during normal 2-D imaging. In addition, the arrangement of FIG. 2 allows use of the same circuits to remove any d.c (direct current) offset of the input signal.

In normal 2-D operation, therefore, the A/D conversion section functions as a simple flash converter equipped with an offset or bias adjustment. This is set by the digital code specified as the bias level. In doppler mode, the structure is a first order delta-sigma loop. Oversampling is provided by the relatively low bandwidth of the doppler signal and the high frequency of the clock (not shown) used by the A/D converter.

The combination of analog summer 42, D/A converter 44, and integrator 46 in the above circuit increases the doppler resolution, thereby avoiding any need for use of higher resolution flash converters. By providing loop feedback in this manner, the digital noise associated with the relatively poor resolution of the flash converter is shifted to higher frequencies where it may be filtered.

Figure 3:
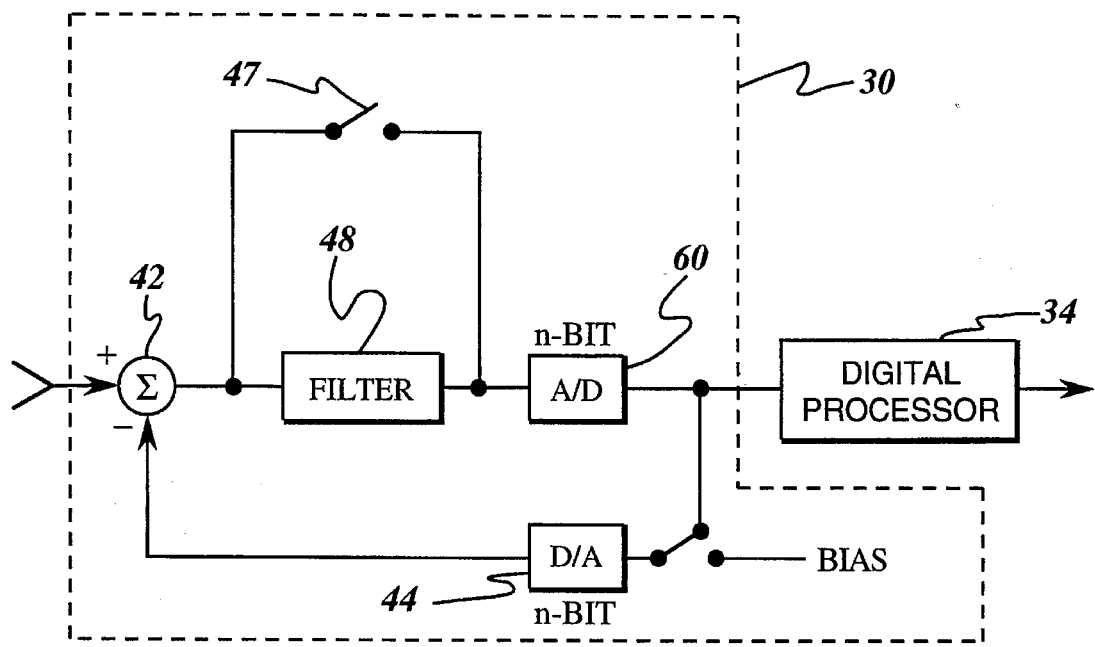
FIG. 3 is a block diagram representation of an alternative embodiment of the A/D conversion section of FIG. 2 of a system according to the present invention.

In another embodiment, as shown in FIG. 3, integrator 46 is replaced by a resonating filter 48 to center the null of the digital noise at the frequency of the doppler signal, thereby forming a band-pass delta-sigma converter. The reference numbers in FIG. 3 refer to the same or like parts previously discussed with reference to FIG. 2. Similar to the integrator embodiment of FIG. 2, filter 48 is used only when the system operates in the doppler mode, and is bypassed when the system is in the 2-D mode.

Figure 4:
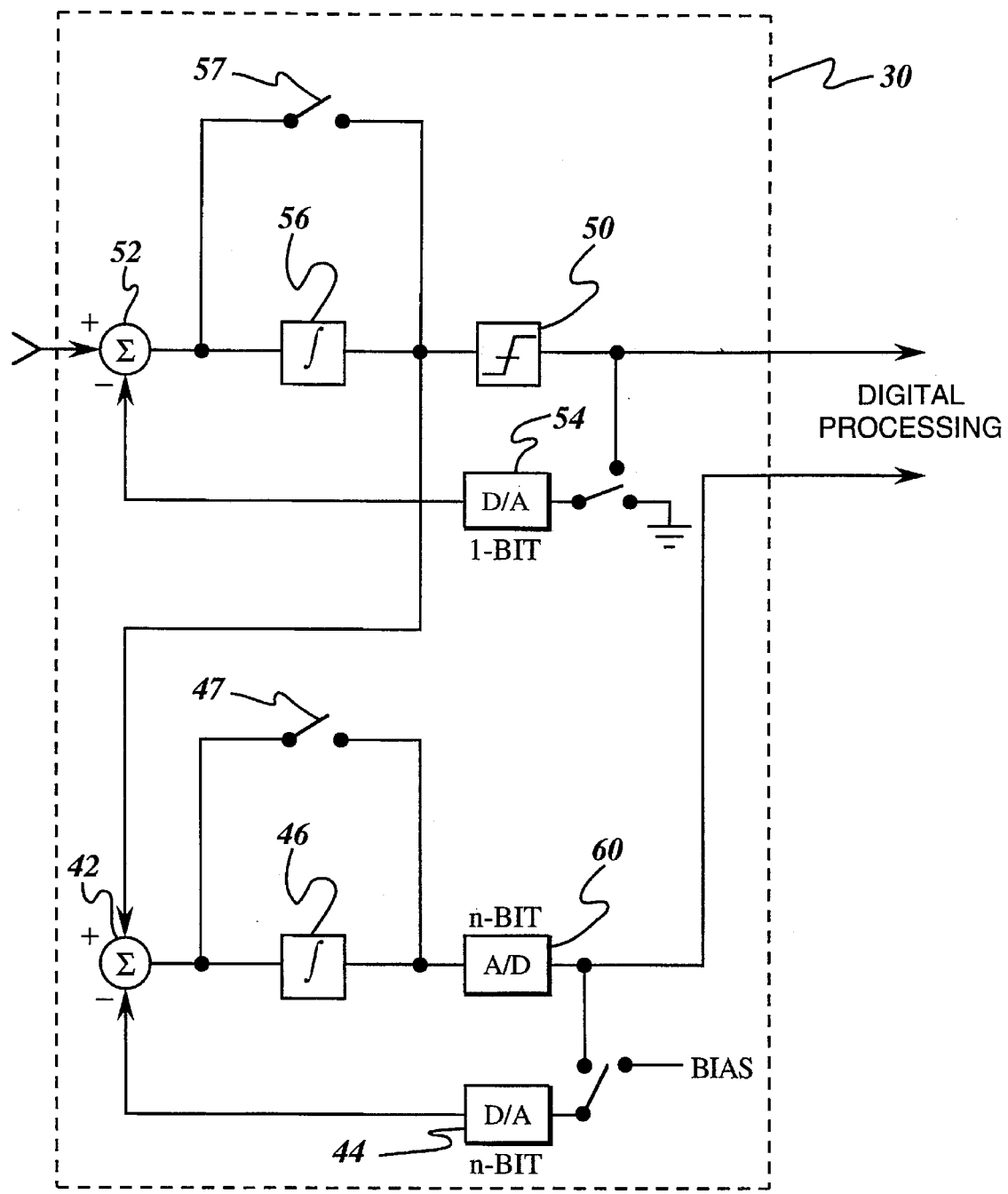
FIG. 4 is a block diagram representation of another alternative embodiment of the A/D conversion section of a system according to the present invention.

Higher order loops, or loops comprised of multiple first order sections, may be employed when desired to reduce sampling noise still further. A useful example of this architecture is shown in FIG. 4, which comprises two first order loops in series. The upper loop in FIG. 4 utilizes a comparator 50 as a single bit A/D converter. The lower loop uses, for example, an 8-bit flash A/D structure as described above with regard to Figure 2.

In the circuit of FIG. 4, prior to entering comparator 50, the amplified and filtered analog signals are supplied to an analog summer 52. Summer 52 combines the analog signals with the output signal of a single bit D/A converter 54. Using a single bit D/A converter ensures that linearity of the feedback is maintained. This circuit arrangement provides loop feedback from D/A converter 54 when the system is in the doppler mode.

An integrator 56 is selectively coupled to summer 52 for producing a signal proportional to the summed analog signals over time. Integration by integrator 56 is performed only when the system is in doppler mode; the integration step is bypassed, by closing bypass switch 57, when the system is in 2-D mode.

The output signal of integrator 56 in the doppler mode, or the output signal of summer 52 in the 2-D mode, is fed simultaneously to comparator 50 and the input of summer 42 of the lower loop. The functions of the lower loop in the 2-D and doppler modes have been described previously with regard to the embodiment of FIG. 2. When combined, the upper and lower loops provide added digital noise reduction in the doppler mode, and the same desired flash A/D conversion and bias correction in the normal 2-D imaging mode.

Other modifications or design trade-offs of the circuits of these loops are contemplated. For example, n-bit D/A converter 44 of FIGS. 2–5 may be a single bit D/A converter at the expense, however, of additional digital circuitry in the digital processing section.

Figure 5:
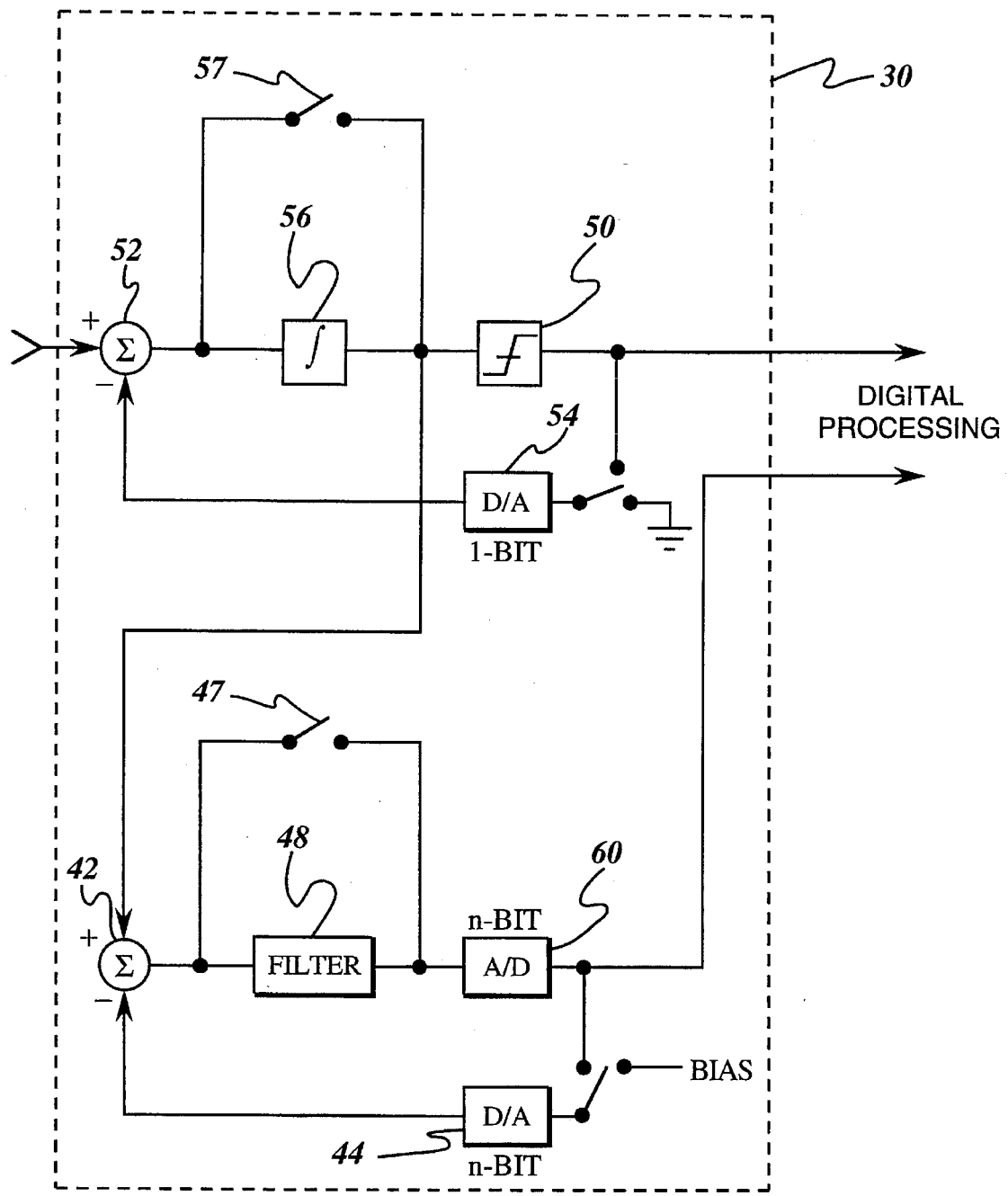
FIG. 5 is a block diagram representation of still another alternative embodiment of the A/D conversion section according to the present invention.

Moreover, the first order loop embodiment of FIG. 3 may be combined in series with another first order loop as shown in FIG. 5. The upper loop of FIG. 5 operates in the same manner as the upper loop of FIG. 4 discussed above. In addition, it is contemplated that the entire electronic circuitry shown in FIGS. 2–5 can be manufactured using conventional integrated circuit (IC) techniques.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A dual mode ultrasonic imager system operative in both a two dimensional (2-D) mode and doppler mode and including a plurality of transducers for receiving analog ultrasonic signals and converting said analog ultrasonic signals to analog electrical signals, and an A/D converter system for converting said analog electrical signals to digital signals for further processing, said A/D converter system comprising:

a digital to analog (D/A) converter for converting said digital signals into analog feedback signals;

an analog summer for receiving said analog electrical signals and combining the analog electrical signals with said analog feedback signals;

an integrator selectively coupled to receive an output signal from the analog summer and for generating an integrated analog signal; and an A/D converter for selectively receiving, and converting to an equivalent digital signal, one of the integrated analog signal and an output signal of the analog summer.

2. The dual mode ultrasonic imager system recited in claim 1 including circuit means for providing a conductive path around said integrator during the 2-D mode and for interrupting said conductive path to allow said A/D converted to receive output signals of the analog summer during the doppler mode.

3. The dual mode ultrasonic imager system recited in claim 2, wherein said A/D converter comprises a comparator and wherein said A/D converter system further comprises:

a second analog summer for receiving said integrated analog signal from said integrator;

a second D/A converter for providing an analog output signal to said analog summer to be combined therein with said analog signal from said integrator;

a second integrator selectively coupled to receive an output signal from the second analog summer and to generate a second integrated analog signal; and a second A/D converter for selectively receiving, and converting to an equivalent digital signal, one of the second integrated analog signal and output signal of the second analog summer, said second D/A converter being coupled to receive the digital signal produced by the second A/D converter and for converting the digital signal to an equivalent analog signal for application to the second analog summer.

4. The dual mode ultrasonic imager system recited in claim 3 including second circuit means for providing a conductive path around said second integrator during the 2-D mode and for interrupting said conductive path around said second integrator to allow said second A/D converter to receive output signals of the second analog summer during the doppler mode.

5. The dual mode ultrasonic imager system recited in claim 2, wherein said A/D converter comprises a comparator and wherein said A/D converter system further comprises:

a second analog summer for receiving said integrated analog signal from said integrator;

a second D/A converter for providing an analog output signal to said analog summer to be combined therein with said analog signal from said integrator;

a filter selectively coupled to receive an output signal from the second analog summer and to generate a filtered analog signal; and a second A/D converter for selectively receiving, and converting to an equivalent digital signal, one of the second filtered analog signal and output signal of the second analog summer, said second D/A converter being coupled to receive the digital signal produced by the second A/D converter and for converting the digital signal to an equivalent analog signal for application to the second analog summer.

6. The dual mode ultrasonic imager system recited in claim 5 including second circuit means for providing a conductive path around said filter during the 2-D mode and for interrupting said conductive path around said filter to allow said second A/D converter to receive output signals of the second analog summer during the doppler mode.

7. A dual mode ultrasonic imager system operative in both a two dimensional (2-D) mode and doppler mode, and including a plurality of transducers for receiving analog ultrasonic signals and converting said analog ultrasonic signals to analog electrical signals, and an A/D converter system for converting said analog electrical signals to digital signals for further processing, said A/D converter system comprising:

a digital to analog (D/A) converter for converting said digital signals into analog feedback signals;

an analog summer for receiving said analog electrical signals and combining the analog electrical signals with said analog feedback signals;

a filter selectively coupled to receive an output signal from the analog summer and for generating a filtered analog signal; and an A/D converter for selectively receiving, and converting to an equivalent digital signal, one of the filtered analog signal and an output signal of the analog summer.

8. The dual mode ultrasonic imager system recited in claim 7 including circuit means for providing a conductive path around said filter during the 2-D mode and for interrupting said conductive path to allow said A/D converter to receive output signals of the analog summer during the doppler mode.

9. A method of performing ultrasonic imaging in a doppler mode, comprising the steps of:

receiving an analog ultrasonic signal at each of a plurality of transducers;

converting each of the analog ultrasonic signals to a respective analog electrical signal;

filtering each of the analog electrical signals;

summing each respective one of the filtered analog electrical signals with a respective analog electrical signal produced by a digital to analog (D/A) converter;

integrating each of the summed analog electrical signals, respectively;

converting each of the integrated, summed analog electrical signals into a respective digital signal; and providing each of the respective digital signals to a digital signal processing system for signal processing, and to said D/A converter.

10. The method of performing ultrasonic imaging in a doppler mode as recited in claim 9, further comprising the additional steps of:

summing each of the respective integrated, summed analog electrical signals with an output signal from a respective, second digital to analog (D/A) converter to produce a respective, second summed analog electrical signal;

integrating said second summed analog electrical signal;

providing as a respective second integrated analog output signal the respective, integrated, second summed analog electrical signal;

converting said respective, second integrated analog output signal to a respective equivalent digital signal; and providing said respective equivalent digital signal to said digital signal processing system, and to said second D/A converter.

11. The method of performing ultrasonic imaging in a doppler mode as recited in claim 9, further comprising the additional steps of:

summing each of the respective, integrated, summed analog electrical signals with an output signal from a respective, second digital to analog (D/A) converter to produce a respective, second, summed analog electrical signal;

filtering said second summed analog electrical signal;

providing as a respective filtered analog output signal the respective, filtered second summed analog electrical signal;

converting said respective filtered analog output signal to a respective, equivalent digital signal; and providing said respective, equivalent digital signal to said digital signal processing system, and to said second D/A converter.

12. A method of performing ultrasonic imaging in a two dimensional (2-D) mode, comprising the steps of:

receiving an analog ultrasonic signal at each of a plurality of transducers;

converting each of the analog ultrasonic signals to a respective analog electrical signal;

filtering each of the analog electrical signals;

summing each respective one of the filtered analog electrical signals with a respective analog electrical signal produced by a digital to analog (D/A) converter;

converting each of the summed analog electrical signals into a respective digital signal; and providing each of the respective digital signals to a digital signal processing system for signal processing, and to said D/A converter.

13. The method of performing ultrasonic imaging in a 2-D mode as recited in claim 12, further comprising the additional steps of:

summing each of the respective, summed analog electrical signals with an output signal from a respective, second digital to analog (D/A) converter to produce a respective, second summed analog electrical signal;

converting said respective, summed analog electrical signal into a respective, equivalent digital signal; and providing said respective, equivalent digital signal to said digital signal processing system and to said second D/A converter.

* * * * *